US009836366B2

(12) United States Patent
Schatz et al.

(10) Patent No.: US 9,836,366 B2
(45) Date of Patent: Dec. 5, 2017

(54) THIRD VOTE CONSENSUS IN A CLUSTER USING SHARED STORAGE DEVICES

(71) Applicant: NetApp, Inc., Sunnyvale, CA (US)

(72) Inventors: Bob Schatz, San Carlos, CA (US);
John Muth, Scotts Valley, CA (US);
Stephen H. Strange, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 116 days.

(21) Appl. No.: 14/924,318

(22) Filed: Oct. 27, 2015

(65) Prior Publication Data

US 2017/0116095 A1    Apr. 27, 2017

(51) Int. Cl.
*G06F 11/00* (2006.01)
*G06F 11/20* (2006.01)

(52) U.S. Cl.
CPC .... *G06F 11/2033* (2013.01); *G06F 2201/805* (2013.01)

(58) Field of Classification Search
CPC .................................................. G06F 11/2033
See application file for complete search history.

(56) References Cited

U.S. PATENT DOCUMENTS

| | | |
|---|---|---|
| 5,937,425 A | 8/1999 | Ban |
| 6,219,800 B1 | 4/2001 | Johnson et al. |
| 7,039,694 B2 * | 5/2006 | Kampe ............... H04L 12/2602 709/216 |
| 7,191,357 B2 | 3/2007 | Holland et al. |
| 7,249,150 B1 | 7/2007 | Watanabe et al. |
| 7,680,837 B2 | 3/2010 | Yamato |
| 7,814,064 B2 | 10/2010 | Vingralek |

(Continued)

OTHER PUBLICATIONS

Cornwell, Michael, "Anatomy of a Solid-state Drive," ACM Queue—Networks, vol. 10, No. 10, Oct. 2012, pp. 1-7.

(Continued)

*Primary Examiner* — Christopher McCarthy
(74) *Attorney, Agent, or Firm* — Cesari and McKenna, LLP

(57) ABSTRACT

A third vote consensus technique enables a first node, i.e., a surviving node, of a two-node cluster to establish a quorum and continue to operate in response to failure of a second node of the cluster. Each node maintains configuration information organized as a cluster database (CDB) which may be changed according to a consensus-based protocol. Changes to the CDB are logged on a third copy file system (TCFS) stored on a local copy of TCFS (L-TCFS). A shared copy of the TCFS (i.e., S-TCFS) may be stored on shared storage devices of one or more storage arrays coupled to the nodes. The local copy of the TCFS (i.e., L-TCFS) represents a quorum vote for each node of the cluster, while the S-TCFS represents an additional "tie-breaker" vote of a consensus-based protocol. The additional vote may be obtained from the shared storage devices by the surviving node as a third vote to establish the quorum and enable the surviving node to cast two of three votes (i.e., a majority of votes) needed to continue operation of the cluster. That is, the majority of votes allows the surviving node to update the CDB with the configuration information changes so as to continue proper operation of the cluster.

20 Claims, 8 Drawing Sheets

(56) References Cited

U.S. PATENT DOCUMENTS

| | | | |
|---|---|---|---|
| 7,921,169 B2 | 4/2011 | Jacobs et al. | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,140,860 B2 | 3/2012 | Haswell | |
| 8,156,290 B1 | 4/2012 | Vanninen et al. | |
| 8,205,065 B2 | 6/2012 | Matze | |
| 8,341,457 B2 | 12/2012 | Spry et al. | |
| 8,417,987 B1 | 4/2013 | Goel et al. | |
| 8,495,417 B2 | 7/2013 | Jernigan, IV et al. | |
| 8,539,008 B2 | 9/2013 | Faith et al. | |
| 8,560,879 B1 | 10/2013 | Goel | |
| 8,589,625 B2 | 11/2013 | Colgrove et al. | |
| 8,595,595 B1 | 11/2013 | Grcanac et al. | |
| 8,732,426 B2 | 5/2014 | Colgrove et al. | |
| 8,775,868 B2 | 7/2014 | Colgrove et al. | |
| 8,832,373 B2 | 9/2014 | Colgrove et al. | |
| 8,850,108 B1 | 9/2014 | Hayes et al. | |
| 8,856,593 B2* | 10/2014 | Eckhardt | G06F 11/2028 709/217 |
| 9,201,742 B2* | 12/2015 | Bulkowski | G06F 11/183 |
| 2002/0042693 A1* | 4/2002 | Kampe | H04L 12/2602 702/186 |
| 2003/0120869 A1 | 6/2003 | Lee et al. | |
| 2003/0191916 A1 | 10/2003 | McBrearty et al. | |
| 2005/0144514 A1 | 6/2005 | Ulrich et al. | |
| 2007/0143359 A1 | 6/2007 | Uppala | |
| 2010/0042790 A1 | 2/2010 | Mondal et al. | |
| 2010/0088296 A1 | 4/2010 | Periyagaram et al. | |
| 2011/0035548 A1 | 2/2011 | Kimmel et al. | |
| 2011/0213928 A1 | 9/2011 | Grube et al. | |
| 2012/0011398 A1* | 1/2012 | Eckhardt | G06F 11/2028 714/15 |
| 2012/0079318 A1 | 3/2012 | Colgrove et al. | |
| 2012/0084506 A1 | 4/2012 | Colgrove et al. | |
| 2012/0290788 A1 | 11/2012 | Klemm et al. | |
| 2013/0018854 A1 | 1/2013 | Condict | |
| 2013/0019057 A1 | 1/2013 | Stephens | |
| 2013/0138862 A1 | 5/2013 | Motwani et al. | |
| 2013/0238832 A1 | 9/2013 | Dronamraju et al. | |
| 2013/0238932 A1 | 9/2013 | Resch | |
| 2013/0268497 A1 | 10/2013 | Baldwin et al. | |
| 2013/0290249 A1* | 10/2013 | Merriman | G06F 17/30584 707/610 |
| 2013/0346810 A1 | 12/2013 | Kimmel et al. | |
| 2014/0215129 A1 | 7/2014 | Kuzmin et al. | |
| 2014/0379965 A1 | 12/2014 | Gole et al. | |
| 2017/0091056 A1* | 3/2017 | Watanabe | G06F 11/2069 |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Hwang, Kai et al., "RAID-x: A New Distributed Disk Array for I/O-centric Cluster Computing", IEEE High-Performance Distributed Computing, Aug. 2000, pp. 279-286.

Lamport, Leslie, "The part-time parliament." ACM Transactions on Computer Systems (TOGS) 16.2 (1998): 133-169.

Leventhal, Adam H., "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Ongaro, Diego et al., "In Search of an Understandable Consensus Algorithm," Stanford University, May 2013. Downloaded from https://ramcloud.stanford.edu/wiki/download/attachments/11370504/raft.pdf, 14 pages.

Ongaro et al., "In search of an understandable consensus algorithm (extended version)." 2014, 18 Pages.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the 13th ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

THIRD VOTE CONSENSUS IN A CLUSTER USING SHARED STORAGE DEVICES

BACKGROUND

Technical Field

The present disclosure relates to storage systems and, more specifically, to establishment of a quorum in a cluster of storage systems.

Background Information

A storage system typically includes one or more storage devices, such as solid state drives (SSDs) embodied as flash storage devices, into which information (i.e., data) may be entered, and from which data may be obtained, as desired. The storage system (i.e., node) may logically organize the data stored on the devices as storage containers, such as files and/or logical units (LUNs). To improve the performance and availability of the data contained in the storage containers, a plurality of nodes may be interconnected as a cluster configured to provide storage service relating to the organization of the storage containers and with the property that when one node fails another node (i.e., the surviving node) may service data access requests, i.e., operations, directed to the failed node's storage containers. However, more than one surviving node (which may include a node that the cluster had incorrectly determine as failed) may attempt to service the data access requests directed to the failed node's storage container, which may result in data corruption. Typically, this may be solved using a quorum; however, for small clusters, this approach is inefficient (or even fails), as losing a single node may result in an inability to establish a quorum so as to continue to serve data.

Typically, failover in a cluster depends on a quorum to guarantee that no two disjoint sets of nodes within the cluster each attempt to make progress (e.g., write to the storage devices) on their own, potentially leading to data corruption. The quorum may be implemented as a voting scheme, where each node in the cluster is granted a number of votes (e.g., one) and as long as a majority of votes allocated across the cluster is cast among non-failing nodes (surviving nodes), the surviving nodes may continue to operate as the cluster and make progress. However, for a small, e.g., two-node, cluster where each node has a single quorum vote, a failure to a node results in the surviving node not having a sufficient number of votes to constitute a majority, thus preventing proper operation of the cluster.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
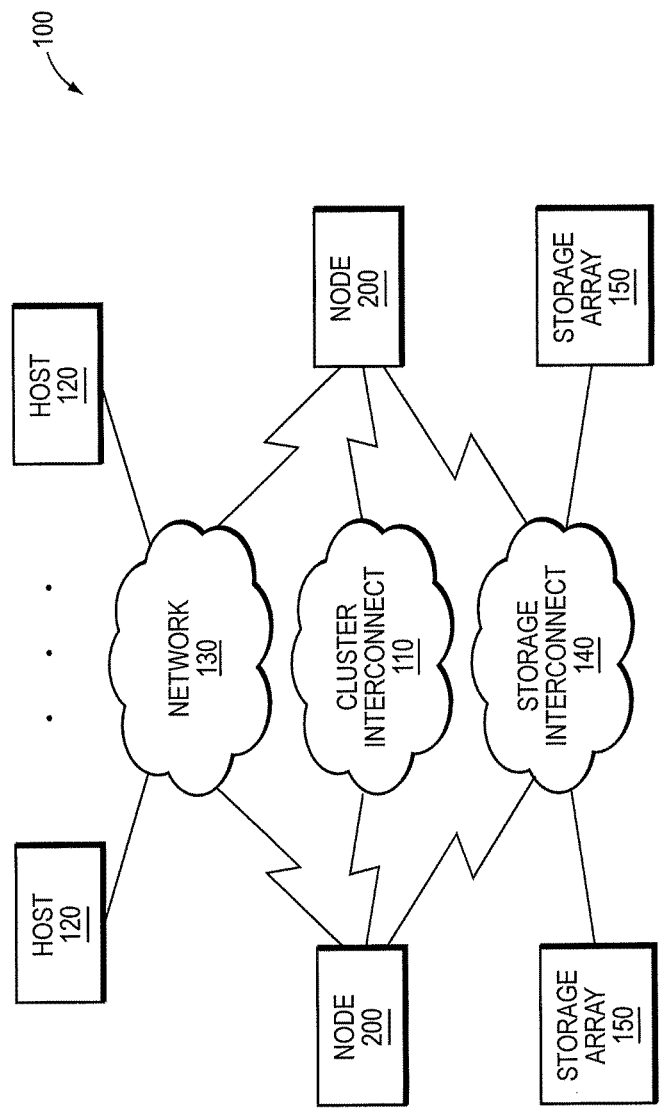
FIG. 1 is a block diagram of a plurality of nodes interconnected as a cluster.

The embodiments herein provide a "third vote" (i.e., a tie-breaking vote) consensus technique for small clusters that lack a quorum to determine a failover node. The "third vote" illustratively represents one or more floating votes in the cluster that are not permanently assigned to a specific node. Depending on the number of nodes in the cluster, the tie-breaking vote may not be a numerically third vote. For example, for a two-node cluster, the technique enables a first node, i.e., a surviving node, to establish a quorum and continue to operate (i.e., takeover storage services) in response to failure of a second node of the cluster. Each node maintains configuration information organized as a cluster database (CDB), which may be changed according to a consensus-based protocol (e.g., Raft). Changes to the CDB are logged on a third copy file system (TCFS) stored on a local service storage device of the node, i.e., a local copy of TCFS (L-TCFS). In addition, a shared copy of the TCFS (i.e., S-TCFS) may be stored on shared storage devices of one or more storage arrays coupled to the nodes. In other words, the L-TCFS is accessible to the local node, whereas the S-TCFS is accessible by all nodes of the cluster. Illustratively, the local copy of the TCFS (i.e., L-TCFS) represents a quorum vote for each node of the cluster in order to effect changes to the CDB (e.g., establish takeover from the failed node), while the S-TCFS represents an additional "tie-breaker" vote of the consensus-based protocol. The additional vote may be obtained from the shared storage devices by the surviving node as an additional, i.e., third vote, to establish the quorum and enable the surviving node to cast two of three votes (i.e., a majority of votes) needed to continue operation of the cluster. That is, the majority of votes allows the surviving node to update the CDB with the configuration information changes so as to continue proper operation of the cluster (i.e., successfully takeover from the failed node).

Although both nodes have access to the shared storage devices (via non-exclusive disk reservations), only one node of the cluster may obtain and become an owner of the S-TCFS and, thus, cast an additional vote according to the consensus-based protocol. For example, if the non-owner node of S-TCFS fails, the owner node may still cast two votes, e.g., its L-TCFS vote and the S-TCFS vote, and the cluster may continue to operate. However, if the owner node of S-TCFS fails, the non-owner node (i.e., the surviving node) may claim the tie-breaker vote through a "get out the vote" (GOTV) operation that fences (i.e., disallows access to) the failed node from the shared storage devices, thus preventing the failed node from attempting to claim the S-TCFS. Fencing may be implemented using exclusive disk reservations that are asserted on the shared storage devices by the surviving node in a predetermined order to prevent a situation where each node fences a subset of the devices, resulting in deadlock. As part of the GOTV operation, the surviving node takes control of the S-TCFS and claims the third vote needed to continue operation of the cluster.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in, but not limited to, a storage area network (SAN). As described herein, the components of each node 200 include hardware and software functionality that enable the node to connect to one or more hosts 120 over a computer network 130, as well as to one or more storage arrays 150 of shared storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
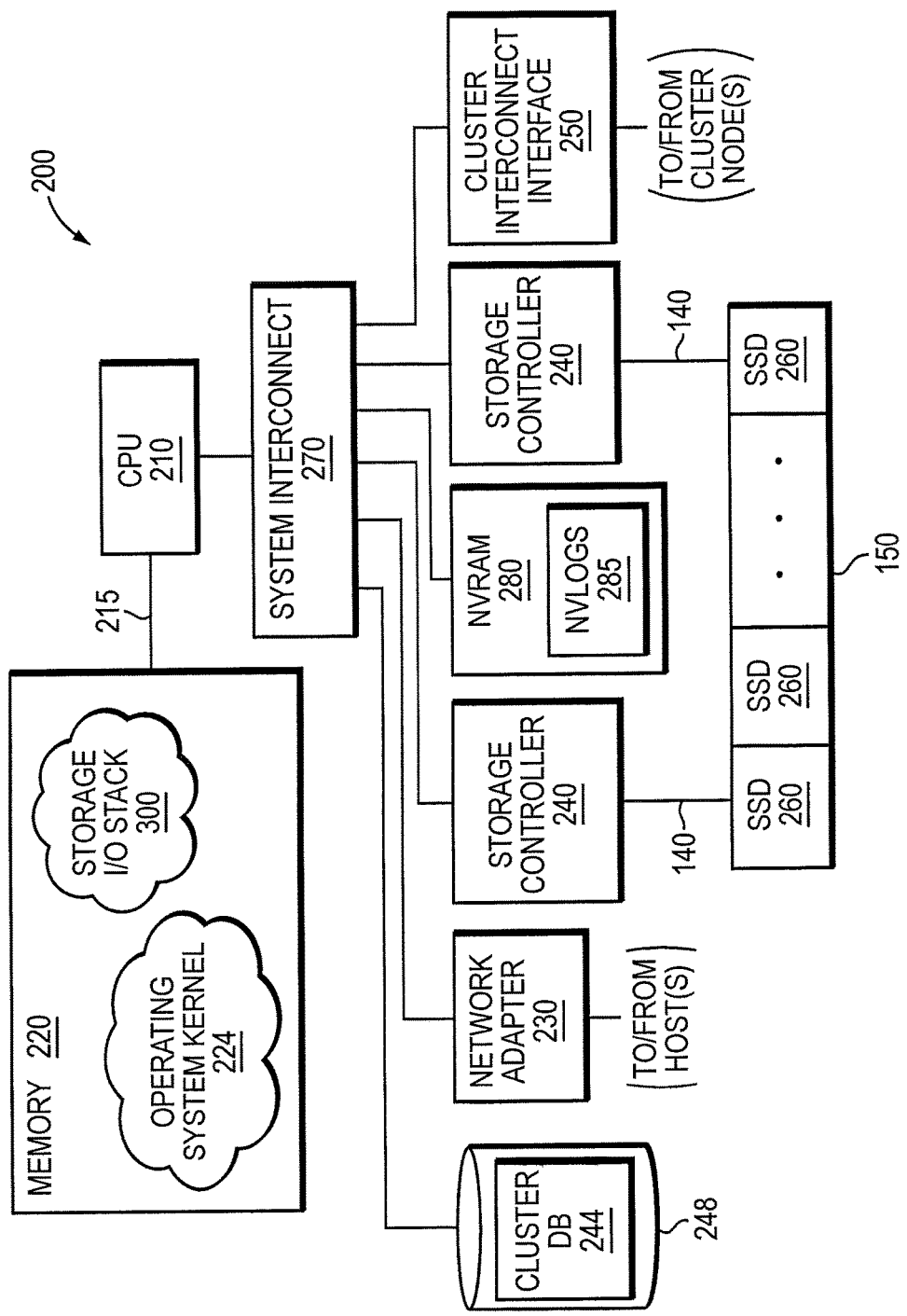
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on shared storage devices such as hard disk drives (HDDs) and/or solid state drives (SSDs) 260, the latter of which are illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (CDB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
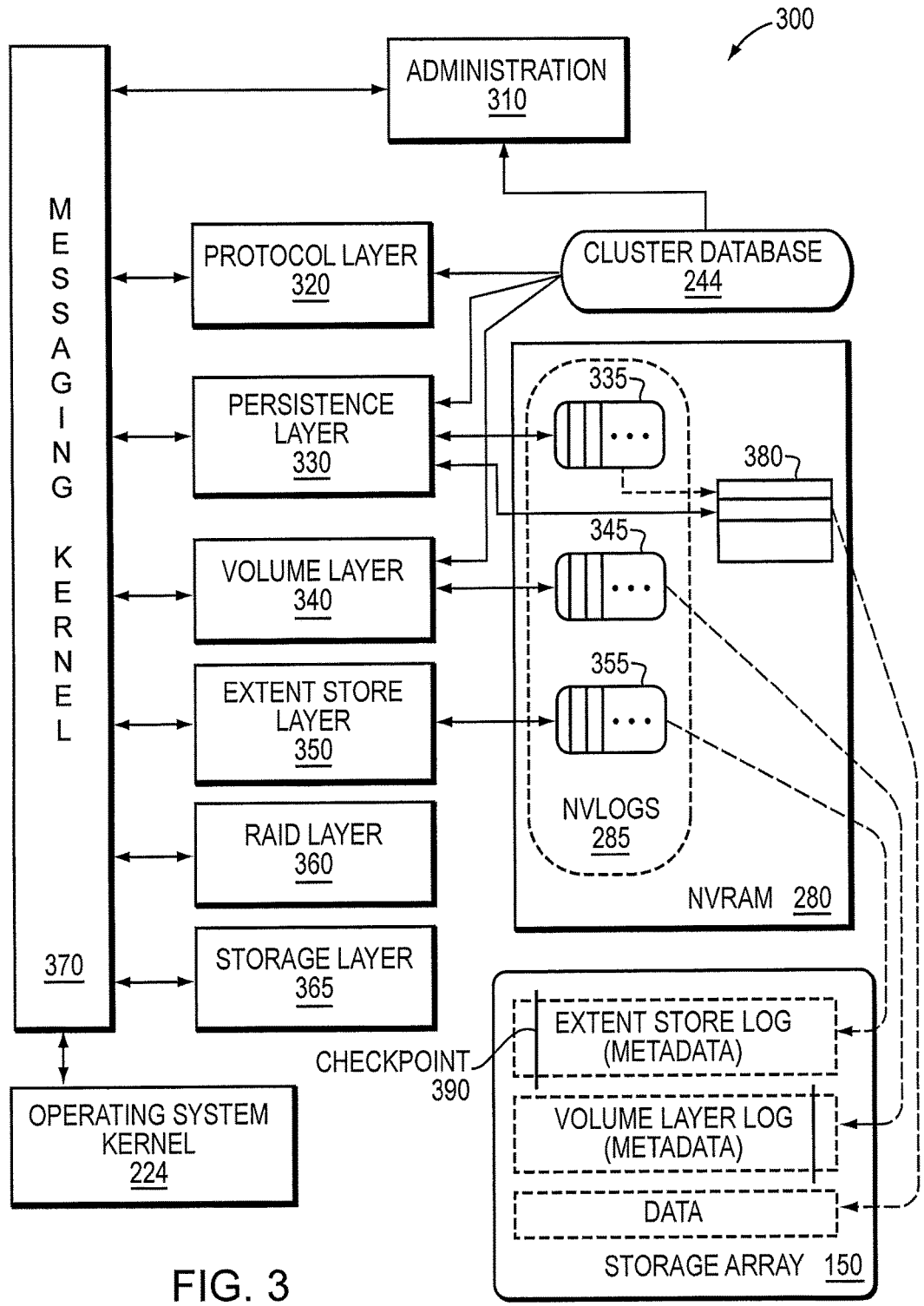
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings (less than the total), are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
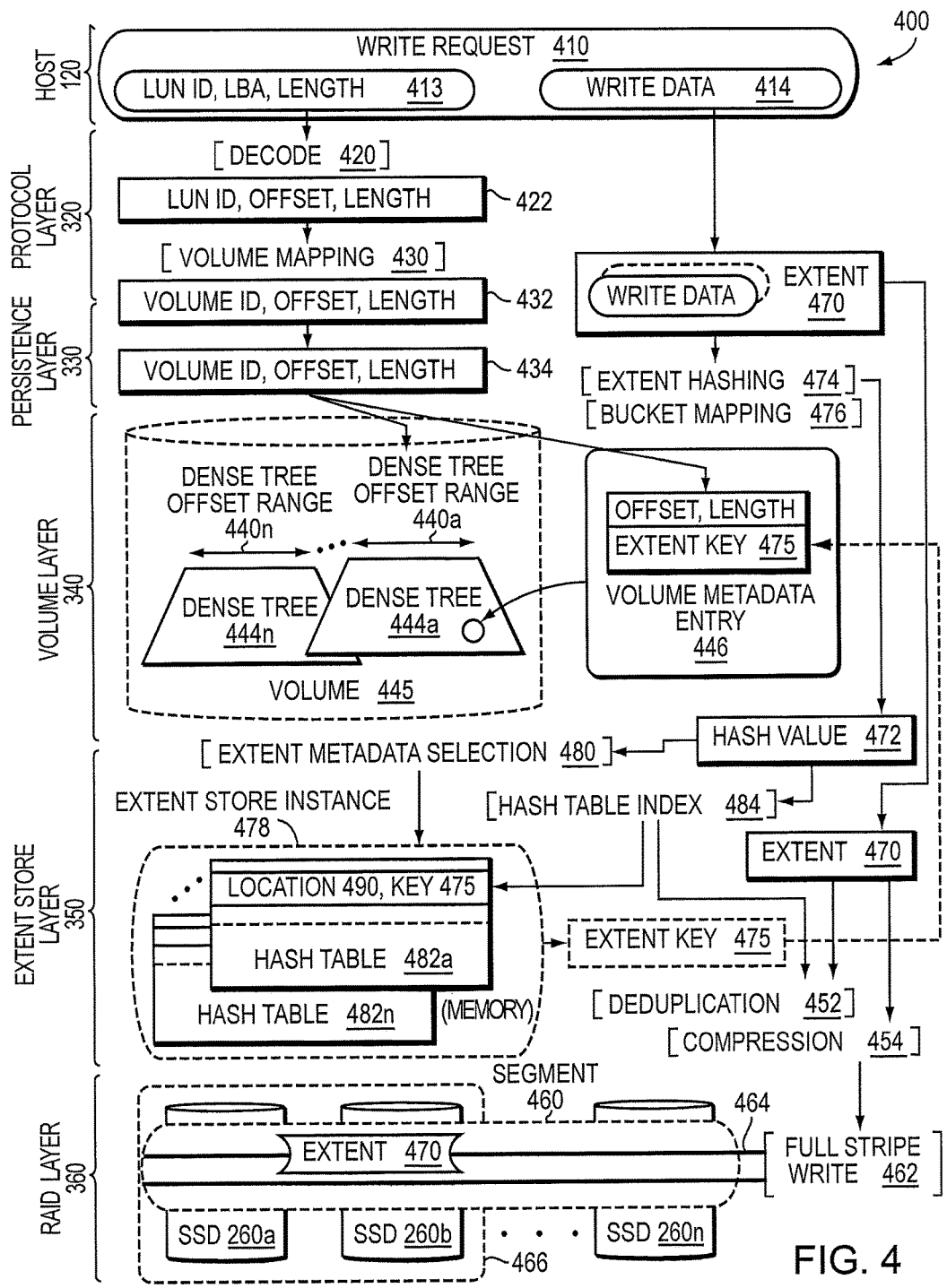
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 478) that is responsible for storing the new extent 470. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
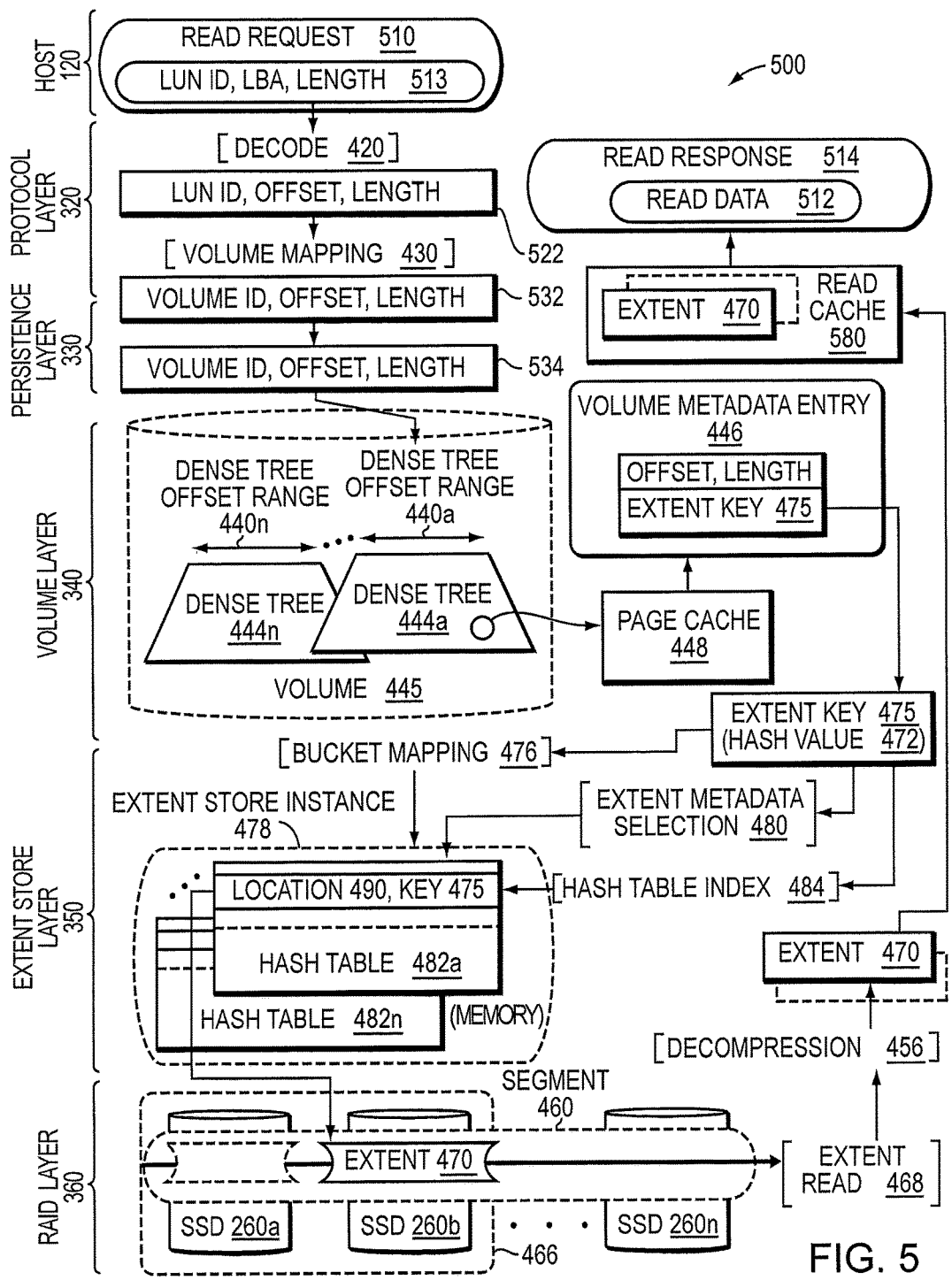
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 470 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If no metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 480 that (i) selects an appropriate hash table 482 (e.g., hash table 482a) from a set of hash tables within the extent store instance 478, and (ii) extracts a hash table index 484 from the extent key 475 (i.e., hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

High Data Availability

In an embodiment, two or more nodes 200 of the cluster may be configured to provide failover protection to each other in the event of a failure to one or more of the nodes. In order to implement such failover protection, the nodes 200 may communicate among themselves across one or more communication links, such as the cluster interconnect 110, to establish a HA partner arrangement. Each node 200 may maintain information relating to status of hardware and software associated with the node, as well as status of data access requests (operations) serviced and logged (e.g., NVlog 335) by the node. Illustratively, the status of the logged operations may indicate that the operations have not yet been committed (i.e., persistently stored) to the shared storage devices (e.g., SSDs 260) of the cluster. The information is illustratively maintained in the NVRAM 280 of the node (i.e., the local node servicing the I/O requests) and, to guarantee high data availability, copied (mirrored) over HA interconnect 610 to the NVRAM of a partner node associated with the local node in accordance with the established HA partner arrangement so as to synchronize the information between the local and partner nodes. Note that in other embodiments such synchronization may occur among three or more nodes.

Figure 6:
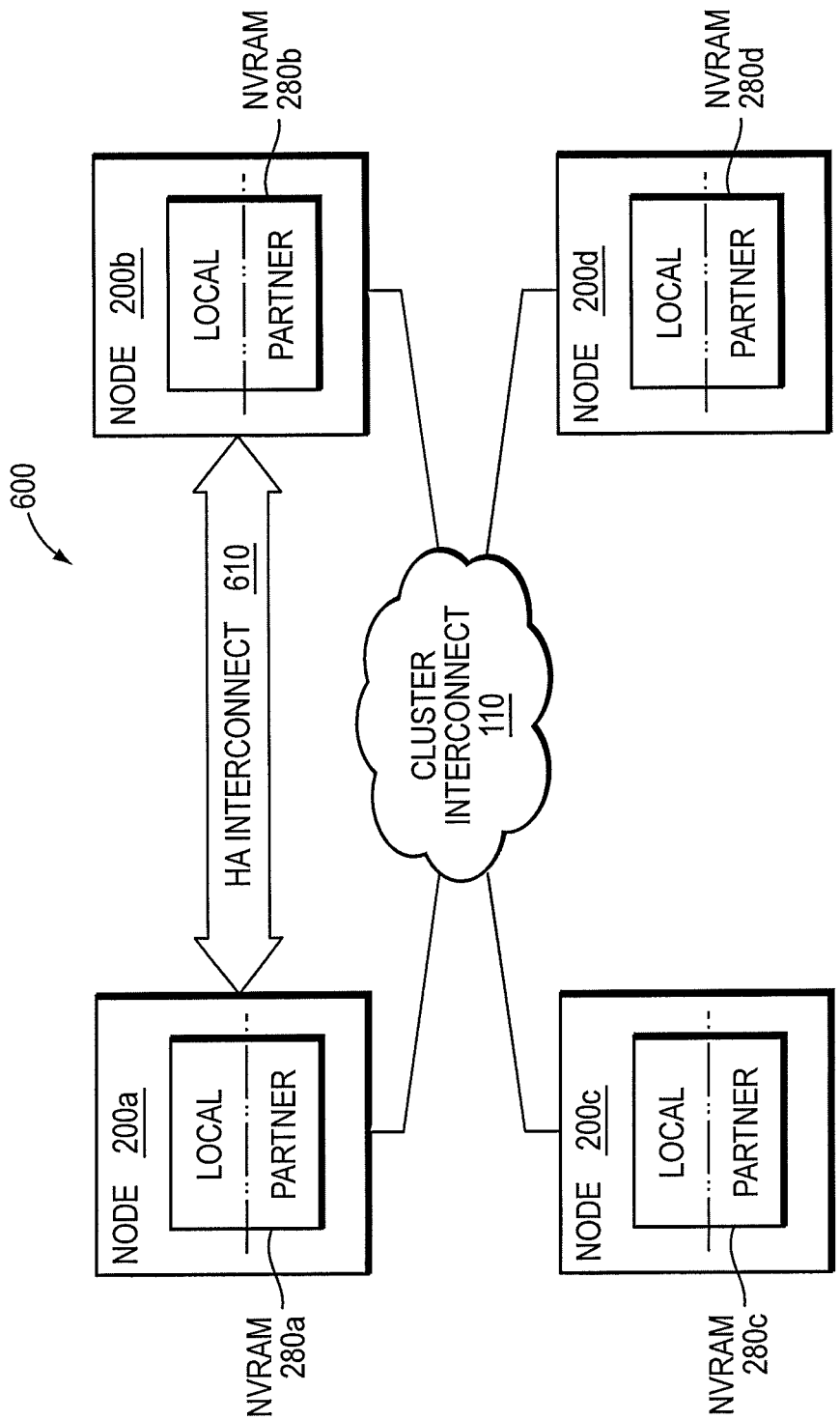
FIG. 6 illustrates a high availability (HA) partner arrangement in a multi-node cluster.

FIG. 6 illustrates an HA partner arrangement 600 that facilitates high data availability in a multi-node cluster. The NVRAM 280a,b of each node is illustratively organized into two portions. A first portion (i.e., the "LOCAL" portion) of the NVRAM may store information about the hardware and software, including logged operations, of the local node, and a second portion (i.e., the "PARTNER" portion) of the NVRAM may store similar, mirrored information associated with its partner node. For example, assume the operations include data access requests, such as write requests. The local node (e.g., node 200a) may receive and execute (i.e., process) the operations and then record (i.e., log) the operations to the LOCAL portion of the NVRAM 280a prior to committing the processed operations to persistent storage (e.g., SSD 260). Thereafter, the local node 200a may mirror the operations over the HA interconnect 610 to the PARTNER portion of the NVRAM 280b on its partner node (e.g., node 200b) to synchronize the local and partner nodes with respect to the mirrored operations. In response to a failure of the local node, the partner node may initiate a failover that essentially takes over the storage service(s) provided by the local node. During failover of services of the local node to the partner node, various software components (e.g., layers) of the nodes may interoperate (i.e., interact) to efficiently coordinate the failover.

Typically, failover in a cluster depends on a quorum (or consensus algorithm) to guarantee that no two disjoint sets of nodes within the cluster each attempt to make progress (e.g., write to disk) on their own, potentially leading to data corruption (i.e., a "split brain" condition). The quorum may be implemented as a voting scheme, where each node in the cluster is granted a number of votes (e.g., one) and as long as a majority of votes allocated across the cluster is cast among non-failing nodes (surviving nodes) that may communicate with one another, the surviving nodes may continue to operate as the cluster and make progress. However, for a small, e.g., two-node, cluster where each node has a single quorum vote, a failure to a node results in the surviving node not having a sufficient number of votes to constitute a majority, thus preventing operation of the cluster.

Third Vote Consensus

The embodiments herein provide a "third vote" (i.e., a tie-breaking vote) consensus technique for small clusters that lack a quorum to determine a failover node. The "third vote" illustratively represents one or more floating votes in the cluster that are not permanently assigned to a specific node. Depending on the number of nodes in the cluster, the tie-breaking vote may not be a numerically third vote. For example, for a two-node cluster, the technique enables a first node, i.e., a surviving node of cluster 100, to establish a quorum and continue to operate (i.e., takeover storage services) in response to failure of a second node of the cluster. Each node maintains configuration information organized as the CDB 244, which may be embodied as changes according to a consensus-based protocol. An exemplary consensus protocol is "Raft" as described in *In Search of an Understandable Consensus Algorithm (Extended Version)* by D. Ogaro et. al, Proceedings of 2014 Usenix Annual Technical Conference (ATC), pp. 305-319. Changes to the CDB are logged on a third copy file system (TCFS) stored on the local service storage device 248 of the node, i.e., a local copy of TCFS (L-TCFS). Illustratively, the configuration information may be stored as records of the CDB and embodied as a sequence (i.e., log) of configuration updates, wherein examples of the updates include (i) LUNs that have been created, (ii) mapping of the LUNs to various initiators/initiator groups, (iii) volume names, and (iv) a number of volumes. There may be multiple sources in the cluster that provide updates to a CDB record (e.g., a user creating a LUN and a node re-configuration). Further, these updates may occur at any time as, e.g., asynchronous events. There also may be internally generated CDB update events (i.e., log entries) representing configuration state changes, e.g., failure of a node, which are represented by one or more CDB configuration updates.

Figure 7A:
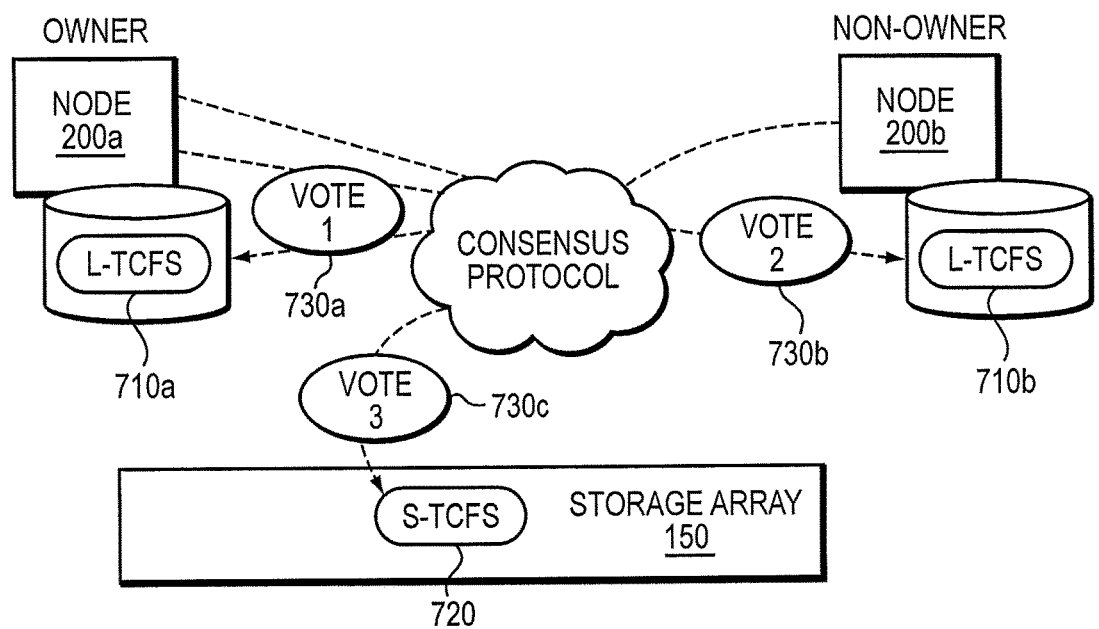
FIG. 7A illustrates a third vote consensus technique for a node cluster during nominal operation.

According to the Raft consensus-based protocol, a defined sequence (ordering) of the configuration updates is provided across the nodes of the cluster so as to enable tie-breaking (i.e., "third vote"). The consensus-based protocol is employed to ensure that these asynchronous events are ordered across all the nodes, i.e., to ensure that a situation does not occur where event A occurs before event B on one node, and event B occurs before event A on another node. For example, in response to a node failure, a higher-level cluster membership manager (not shown) may transmit a heartbeat (an HA-based heartbeat) used to detect failure of the node (i.e., the node does not respond to the heartbeat transmission within a defined timeout period). Detection of the node failure results in a CDB configuration update. The configuration update to the CDB, in turn, results in one or more update events using the consensus-based protocol. A majority of the nodes in the cluster accept the update events, which are illustratively organized as a cluster-wide consensus log representing the order of the events as they occur and commit. Although ordering is guaranteed at all times, global consistency is not, e.g., a node that may be out of synchronization for a few update events will eventually resynchronize in the proper order, i.e., consistency is eventually achieved. FIG. 7A illustrates the third vote consensus technique for a two-node cluster during nominal operation wherein each node has a vote (vote 730*a* and 730*b*) and third vote 730*c* (owned by node 200*a*) is generated according to the third vote consensus technique described herein.

Figure 7B:
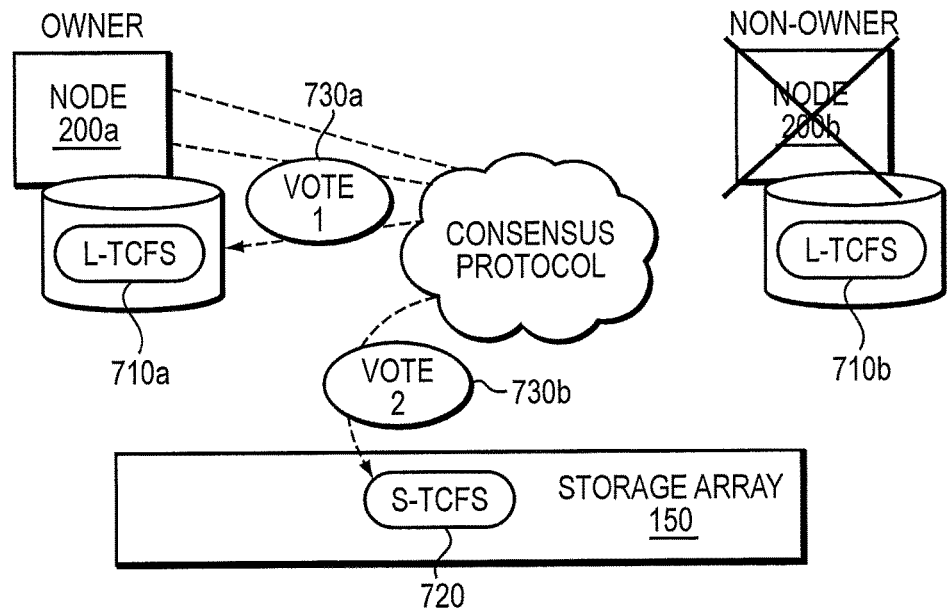
FIGS. 7B and 7C illustrate a third vote consensus technique for a two-node cluster during failure of a node.
Figure 7C:
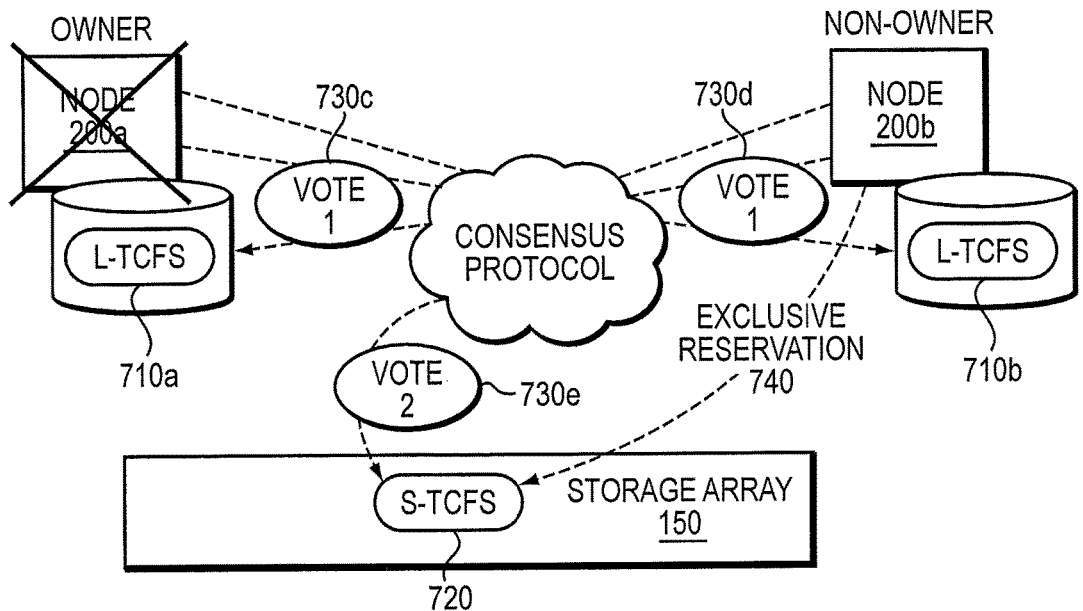

FIGS. 7B and 7C illustrate the third vote consensus technique for a two-node cluster during failure of a node. In an embodiment, only one of the nodes may claim ownership of the shared TCFS (i.e., S-TCFS) to enable control and update to the CDB. Note that both nodes may have access to the storage devices (SSDs) 260; however such ownership of the S-TCFS may be implemented using disk reservations (e.g., SCSI-3 disk reservations). A leadership election policy in the consensus protocol may decide which node is the owner node, e.g., 200*a* (FIG. 7A), although such decision is not strictly based on which node is a current leader. However, a common situation may occur in a two-node cluster where the leader node fails (FIG. 7C) while having control of the S-TCFS. In this situation, the other node may forcibly claim ownership of the S-TCFS from the failed node 200*a* (FIG. 7C) using the disk reservations to fence off node 200*a*.

Illustratively, a shared copy of the S-TCFS 720 is stored on the SSDs 260 of the storage arrays 150 coupled to the nodes 200*a,b*. Because any SSD of the array(s) 150 may fail and be replaced (e.g., in accordance with operation of the RAID layer 360), the configuration information (i.e., consensus log) of the S-TCFS 720 is replicated (stored) across all SSDs of the arrays. Accordingly, the contents of the consensus log are illustratively replicated across all SSDs of a shelf (e.g., 24 SSDs), such that one representative copy of S-TCFS 720 is stored across the SSDs in the shelf. However, in an alternative embodiment, the contents of the consensus log may be mirrored across a subset of the SSDs, while in other embodiments, layouts other than mirroring, such as various RAID configurations or eraser code, may be used to store the log on the SSDs.

The local copy of the TCFS (i.e., L-TCFS) 710*a,b* represents a quorum vote 730*a,c,d* (vote 1) for each node 200*a,b* of the cluster in order to effect changes to the CDB, while the S-TCFS 720 represents an additional "tie-breaker" vote 730*b,e* of the consensus-based protocol. The additional vote may (i.e., vote 2) be obtained from the SSDs 260 by the surviving node (e.g., node 200*a* in FIG. 7B and node 200*b* in FIG. 7C) as a third vote 730*b,e* (vote 2) to establish the quorum and enable the surviving node to cast two of three votes (i.e., a majority of votes) needed to continue operation of the cluster 100. That is, the majority of votes allows the surviving node to update the CDB 244 with the configuration information changes so as to continue proper operation of the cluster (i.e., successfully takeover from the failed node).

Although all the nodes may have access to the shared storage devices (via non-exclusive disk reservations), only one node of the cluster may obtain and become an owner of the S-TCFS and, thus, cast an additional vote according to the consensus-based protocol. For example (FIG. 7B), if the non-owner node 200*b* of S-TCFS 720 fails, the owner node 200*a* may still cast two votes, e.g., its L-TCFS vote 730*a* and the S-TCFS vote 730*b*, and the cluster may continue to operate. Since it controls the S-TCFS vote, the surviving owner node may cast two votes when there is a leader election, thereby rendering itself the owner. Accordingly, in response to a request to update the consensus log, the surviving node may cast two votes to ensure that there is a cluster-wide majority, thereby allowing the configuration update to proceed.

However, if the owner node 200*a* of S-TCFS 720 fails (FIG. 7C), the non-owner node 200*b* (i.e., the surviving node) may claim the tie-breaker vote 730*e* (vote 2) through a "get out the vote" (GOTV) operation that fences (i.e., disallows access to) the failed node 200*a* from the shared storage devices (e.g., storage array 150), thus preventing the failed (or otherwise malfunctioning) node from attempting to claim the S-TCFS 720. In an embodiment, the GOTV operation is driven by the consensus-based protocol, e.g., Raft. As soon as a node becomes uncommunicative and the HA-based heartbeat timeout period expires, the Raft protocol triggers the GOTV operation to obtain ownership of the shared SSDs away from the failing node and enable the surviving node to claim the S-TCFS vote. Fencing may be implemented using disk reservations that facilitate removal of a specific node from an access list, e.g., exclusive disk reservations 740, which are asserted on the shared SSDs by the surviving node in a predetermined order to prevent a situation where each node fences a subset of the devices, resulting in deadlock. For example, assume that the failed node is still sufficiently operational to believe that it is the current leader, e.g., a "split brain" condition, and that it still claims the S-TCFS vote. Since communication with the current leader node is aborted, the non-leader node may attempt to obtain the S-TCFS vote. As a result, a race condition may arise where the two nodes attempt to mark each other "down" in the CDB, i.e., the nodes compete to obtain control of the S-TCFS. If the surviving node wins, the failed node is forced to re-discover who has control of the S-TCFS by, e.g., restarting. As part of the GOTV operation, the surviving node takes control of the S-TCFS 720 and claims the third vote 730*e* (vote 2) needed to continue operation of the cluster.

While there have been shown and described illustrative embodiments of a third vote consensus technique that enables a first node, i.e., a surviving node, of a two-node cluster to establish a quorum and continue to operate in response to failure of a second node of the cluster, it is to be understood that various other adaptations and modifications may be made within the spirit and scope of the embodiments herein. For example, embodiments have been shown and described herein with relation to the two-node cluster. However, the embodiments in their broader sense are not so limited, and may, in fact, also allow for larger cluster configurations, such as a four-node cluster in two different configurations. One configuration may be a four-way HA group that is also a four-node cluster and the other configuration may involve two HA pairs. Note that sharing of the shared SSDs is based on the HA configuration, e.g., 2 pairs vs. 4 nodes in a group, where there may be either 1 or 2 storage pools and where the number of S-TCFS instances is based on the number of HA groups in the cluster, e.g., one S-TCFS instance per storage pool. Notably, each HA group maintains a separate consensus, so that only nodes within an HA group are eligible to be the owner of S-TCFS for that HA group; however any node in the cluster by may be leader.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving a write request directed towards a logical unit (LUN), the write request having data and received at a first node of a cluster, the first node and a second node of the cluster connected to a storage array, the first node connected to a local storage device;
maintaining configuration information of the cluster on the storage array;
maintaining a copy of the configuration information on the local storage device;
in response to the second node failing, obtaining control to update the configuration information on the storage array at the first node using a consensus protocol;
establishing a first vote of the consensus protocol by ownership of the copy of the configuration information on the local storage device; and
establishing a second vote of the consensus protocol by ownership of the configuration information on the storage array.

2. The method of claim 1 further comprising accessing the configuration information on the storage array at the first and second nodes via non-exclusive small computer systems interface (SCSI) reservations.

3. The method of claim 1 further comprising logging changes to the configuration information on the local storage device.

4. The method of claim 1 further comprising establishing a majority vote of the consensus protocol and servicing the write request at the first node.

5. The method of claim 1 further comprising updating the configuration information on the storage array in order of update events from the nodes of the cluster.

6. The method of claim 1 wherein the consensus protocol is Raft.

7. The method of claim 1 further comprising detecting failure of the second node by failure to receive a heartbeat from the second node.

8. The method of claim 1 further comprising failing to establish a quorum using the consensus protocol absent a tie-breaker vote among a number of surviving nodes.

9. The method of claim 8 wherein the second vote is the tie-breaker vote.

10. A method comprising:
receiving a write request directed towards a logical unit (LUN), the write request having data and received at a first node of a cluster, the first node and a second node of the cluster connected to a storage array;
maintaining a local copy of a configuration database of the cluster at each node of the cluster;
maintaining a shared copy of the configuration database on the storage array;
in response to the first node failing, obtaining control to update the shared copy of the configuration database at the second node using a consensus protocol;
obtaining exclusive access to the storage array at the second node;
establishing a first vote of the consensus protocol by ownership of the local copy of the configuration database at the second node;
establishing a second vote of the consensus protocol by ownership of the shared copy of the configuration database at the second node;
updating the configuration database at the second node to reflect the failure of the first node; and
servicing the write request at the second node.

11. A system comprising:
a cluster having first and second nodes, each node having a memory connected to a processor via a bus;
a storage array coupled to each node of the cluster;
a local storage device coupled to each node of the cluster;
a storage I/O stack executing on the processor of each node of the cluster, the storage I/O stack configured to:
receive a write request directed towards a logical unit (LUN), the write request having data and received at the first node of the cluster;
maintain configuration information of the cluster on the storage array;
maintain a copy of the configuration information on the local storage device;
in response to the second node failing, obtain control to update the configuration information on the storage array at the first node using a consensus protocol;
establish a first vote of the consensus protocol by ownership of the copy of the configuration information on the local storage device; and
establish a second vote of the consensus protocol by ownership of the configuration information on the storage array.

12. The system of claim 11 wherein the storage I/O stack is further configured to:
access the configuration information on the storage array at the first and second nodes via non-exclusive small computer systems interface (SCSI) reservations.

13. The system of claim 11 wherein the storage I/O stack is further configured to:
log changes to the copy of the configuration information on the local storage device.

14. The system of claim 11 wherein the storage I/O stack is further configured to:
establish a majority vote of the consensus protocol and service the write request at the first node.

15. The system of claim 11 wherein the storage I/O stack is further configured to:
   update the configuration information on the storage array in order of update events from the nodes of the cluster.

16. The system of claim 11 wherein the consensus protocol is Raft.

17. The system of claim 11 wherein the storage I/O stack is further configured to:
   detect failure of the second node by failure to receive a heartbeat from the second node.

18. The system of claim 11 wherein the storage I/O stack is further configured to, absent a tie-breaker vote among a number of surviving nodes, fail to establish a quorum using the consensus protocol.

19. The system of claim 18 wherein the second vote is the tie-breaker vote.

20. The system of claim 11 wherein the cluster further comprises:
   a plurality of high-availability (HA) groups of nodes, wherein a first HA group includes the first and second nodes.

\* \* \* \* \*